Patented Nov. 2, 1943

2,333,452

UNITED STATES PATENT OFFICE 2,333,452

CARBAMYLGUANAMINES

Jack Theo Thurston, Cos Cob, and Daniel Elmer Nagy, Stamford, Conn., assignors to American Cyanamid Company, New York, N. Y., a corporation of Maine No Drawing. Application August 30, 1941, Serial No. 409,132

13 Claims. (Cl. 260—248)

This invention relates to guanamines in which the 2-carbon atom of the 4,6-diamino-1,3,5-triazine ring contains as the substituent group a carboxylic acid amide which may be either aliphatic or aromatic, and referred to in the specification and claims as carbamylguanamines.

According to the present invention carbamylguanamines of the aliphatic and aromatic series can be prepared by various methods including the reaction of an ester amide of a dibasic acid with biguanide at room temperature or with gentle heating. The ester group reacts with the biguanide to form the diamino triazine ring and the amide group remains attached to the residue of the acid which is connected to the 2-carbon atom of the triazine ring. The products of the present invention can be prepared in water solution although not as high yields are obtained as when organic solvents such as the lower monohydric paraffin alcohols are used as solvents. While the present invention is not limited to any particular process of making the compounds, the reaction of the ester amides with a biguanide in a suitable solvent is preferred. Any suitable organic solvent may be employed which will dissolve the biguanide, but we prefer to use lower aliphatic alcohols such as methanol, ethanol, the ethyl ether of ethylene glycol, and the like. These alcohols are cheap, excellent solvents for biguanides, and operate very satisfactorily in the process. A further advantage lies in the fact that if an alcohol is chosen corresponding to the alcohol radical of the ester amide, no separation between different alcohols is required.

Among the most important products from the practical standpoint are the N-unsubstituted guanamines which are prepared by reacting biguanide itself with ester amides. However, N-substituted guanamines can be prepared by using suitable correspondingly substituted biguanides such as, for example, phenyl biguanide, allyl biguanide or dimethyl biguanide.

The preferred process of the present invention using an ester amide and biguanide reacts readily without a condensing agent which is an advantage, but the invention is not limited to processes in which no condensing agents are used and in fact with some of the substituted biguanides the reaction is rather slow and a condensing agent such as a metal alkoxide is desirable to reduce reaction time and increase yields.

The products of the present invention may be formed into resins with formaldehyde, some of which are oil-soluble and others, by reason of their surface-active amide group are particularly useful as textile finishing and water-repellent agents.

The invention will be described in greater detail in conjunction with the following specific examples. The parts are by weight.

EXAMPLE 1

*o-N-octylcarbamylbenzoguanamine*

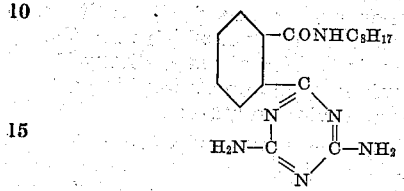

To 25 parts of biguanide dissolved in 100 parts of methanol was added 83.7 parts of methyl N-octylphthalamate and 6 parts of sodium metal dissolved in about 100 parts of methanol. The product began to crystallize from the solution in about one hour and at the end of three hours the reaction mixture was practically solid. After standing overnight, the product was removed by filtration and the filtrate concentrated to yield more product. The yield of crude N-octylcarbamylbenzoguanamine melting at 168° C. was 61% and after recrystallization from 50% ethanol, the melting point was raised to 171° C.

EXAMPLE 2

*β-N-phenylcarbamylpropionoguanamine*

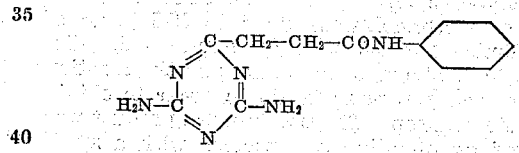

To 12 parts of biguanide dissolved in 60 parts of methanol was added 17.5 parts of succinanil. Precipitation which occurred rapidly gave the guanamine melting at 202-203° C. in about 93% yield. The product was soluble in dilute acid, hot ethanol, but insoluble in water, dilute alkali and cold ethanol.

When the reaction was carried out in water solution instead of in methanol solution, the yield was 12%.

When phenyl biguanide was substituted for biguanide itself, the corresponding 4-N-phenyl guanamine was obtained. The reaction was not quite as rapid and the yield was somewhat lower.

EXAMPLE 3

*Methoxy-N-octylcarbamylpropionoguanamine*

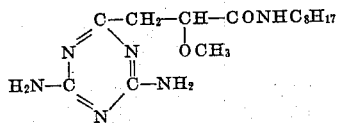

To 25 parts of biguanide dissolved in 100 parts of methanol was added 72 parts of methyl-N-octylmaleamate. The reaction mixture became deep purple and some product separated after standing several days. The reaction mixture was diluted with water which precipitated a dark oily material that was separated from the water. The oily product was extracted with about 1000 parts of hot 2% hydrochloric acid. The free base having the above probable formula was prepared by neutralization with sodium hydroxide and after recrystallization from a 40% alcohol-water mixture, the product melted at about 92° C., and on further drying, the melting point was raised to 146–148° C. The residue from the hydrochloric acid extraction was extracted with 1000 parts of hot water, which removed a slightly soluble hydrochloride salt. The free base was prepared by neutralization with sodium hydroxide and after recrystallization from a 35% alcohol-water mixture, the product melted at 60–62° C. Further drying raised the melting point to 80° C. This compound, which gave the same analytical data as the above methoxy-N-octylcarbamylpropionoguanamine, and which appears to have the following formula:

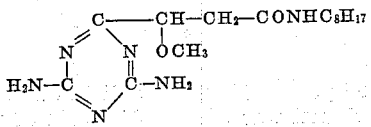

undergoes a change on heating above its melting point since it solidifies at about 105–110° C. and melts at 145° C.

EXAMPLE 4

*o-Carbamylbenzoguanamine*

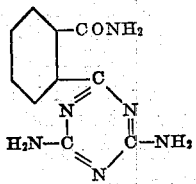

Twenty-five parts of biguanide dissolved in 100 parts of methanol was added to 35.5 parts of phthalimide and 5.5 parts of sodium metal dispersed in 120 parts of methanol and the reaction mixture was warmed slightly in order to obtain complete solution. The precipitated product was removed by filtration and washed with a small amount of methanol and water. The yield of o-carbamylbenzoguanamine melting at 264–266° C. after recrystallization from hot water was slightly less than 60%.

EXAMPLE 5

*β-N-dibutylcarbamylpropionoguanamine*

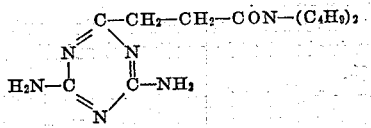

To 37 parts of succinic anhydride dissolved in 400 parts of toluene was added 52 parts of dibutylamine and the reaction mixture was heated at 80° C. for about two hours. The β-N-dibutylcarbamylpropionic acid was then esterified with butanol using sulfuric acid as a catalyst. After removing the acid by washing with dilute sodium bicarbonate the product was dried and then freed of solvent. The resulting mixture of dibutyl succinate and β-N-dibutylcarbamylpropionate was dissolved in 250 parts of methanol containing 49 parts of biguanide and in a short time product began to precipitate. The insoluble material was removed by filtration and washed with methanol. This product, amounting to 22 parts, was identified as succinoguanamine having the following formula:

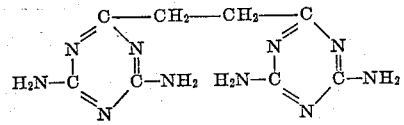

and accounted for about 43% of the succinic anhydride used. The succinoguanamine was formed from the dibutylsuccinate, which was present in larger quantities than the ester amide.

The original methanol filtrate from the succinoguanamine was evaporated to dryness and the residue was extracted with 1500 parts of hot 1% hydrochloric acid. The β-N-dibutylcarbamylpropionoguanamine was recovered from the cooled filtrate by neutralization. After recrystallization from 50% ethanol, 26 parts of the product melting at 150–152° C. was obtained. The low yield was due to the large amount of dibutyl succinate present in the ester amide.

We claim:

1. Carbamylguanamines having the following formula:

in which Am is a member of the group consisting of radicals of primary amines, secondary amines, and ammonia, R is a radical including in the group consisting of arylenes and alylenes and G is a guanamine having a free valence on the 2-carbon atom of the triazine ring, the bond between R and G being a carbon-to-carbon bond.

2. Carbamylguanamines having the following formula:

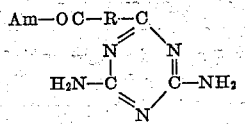

in which Am is a member of the group consisting of radicals of primary amines, secondary amines and ammonia, R is a radical included in the group consisting of arylenes and alkylenes.

3. Carbamylguanamines having the following formula:

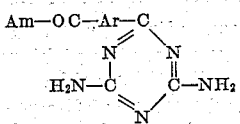

in which Am is a member of the group consisting of radicals of primary amines, secondary amines and ammonia, and Ar is an aryl radical.

4. Carbamylguanamines having the following formula:

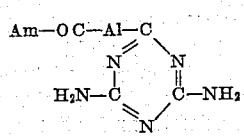

in which Am is a member of the group consisting of primary amines, secondary amines and ammonia and Al is an aliphatic radical.

5. o-N-octylcarbamylbenzoguanamine.
6. β-N-phenylcarbamylpropionoguanamine.
7. β-N-octylcarbamylmethoxypropionoguanamine.
8. A method of preparing a carbamylguanamine which comprises reacting a biguanide with an ester amide of a dicarboxylic acid.
9. A method of preparing a carbomylguanamine which comprises reacting biguanide with an ester amide of a dicarboxylic acid.
10. A method of preparing o-N-octylcarbamylbenzoguanamine which comprises reacting biguanide with an ester of N-octylphthalamic acid.
11. A method of preparing β-N-octylcarbamylmethoxypropionoguanamine which comprises reacting biguanide with an ester of N-octyl maleamic acid in methanol solution.
12. A method according to claim 8 in which the reaction takes place in a solution of a lower monohydric paraffin alcohol.
13. A method according to claim 9 in which the reaction takes place in a solution of a lower monohydric paraffin alcohol.

JACK THEO THURSTON.
DANIEL ELMER NAGY.